US011858798B2

(12) United States Patent
Sayyad et al.

(10) Patent No.: US 11,858,798 B2
(45) Date of Patent: Jan. 2, 2024

(54) REFRIGERATOR APPLIANCE WITH A MESMERIZING DISPENSER

(71) Applicant: Haier US Appliance Solutions, Inc., Wilmington, DE (US)

(72) Inventors: Ramij Ismail Sayyad, Hyderabad (IN); Syed Moin Ahmed, Hyderabad (IN); Srinivas Pasham, Hyderabad (IN); Chaitanya Krishna Karanam, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 238 days.

(21) Appl. No.: 17/117,651

(22) Filed: Dec. 10, 2020

(65) Prior Publication Data

US 2022/0185648 A1 Jun. 16, 2022

(51) Int. Cl.
*B67D 1/08* (2006.01)
*F25D 31/00* (2006.01)
*F25D 23/02* (2006.01)

(52) U.S. Cl.
CPC ......... *B67D 1/0861* (2013.01); *F25D 23/028* (2013.01); *F25D 31/002* (2013.01)

(58) Field of Classification Search
CPC .... B67D 1/0861; F25D 23/028; F25D 31/002
See application file for complete search history.

(56) References Cited

U.S. PATENT DOCUMENTS

| | | | | |
|---|---|---|---|---|
| 5,165,580 A * | 11/1992 | Rosenthal | B67D 1/08 40/442 |
| 5,855,120 A * | 1/1999 | Kim | B67D 1/10 417/12 |
| 8,109,301 B1 | 2/2012 | Denise | |
| 2016/0207753 A1* | 7/2016 | Choi | B67D 1/1238 |

OTHER PUBLICATIONS https://www.kickstarter.com/projects/northerncircuitsinc/aquanus-a-water-manipulating-fountain-lamp.

* cited by examiner

*Primary Examiner* — Elizabeth J Martin
*Assistant Examiner* — Samba Gaye
(74) *Attorney, Agent, or Firm* — Dority & Manning, P.A.

(57) ABSTRACT

A refrigerator appliance includes a dispensing assembly. The dispensing assembly includes a dispenser recess with a flexible hose that is in fluid communication with a water supply to deliver water to the dispenser recess. The dispensing assembly also includes an actuating mechanism in operative communication with the water supply to cause the water supply to deliver a flow of water to the flexible hose when the actuating mechanism is activated. The dispensing assembly further includes a vibration generator coupled to the flexible hose and in operative communication with the actuating mechanism such that the vibration generator is activated when the actuating mechanism is activated. The vibration generator moves the flexible hose relative to the dispenser recess when the vibration generator is activated, thereby providing a wave pattern flow of water from the flexible hose.

17 Claims, 6 Drawing Sheets

REFRIGERATOR APPLIANCE WITH A MESMERIZING DISPENSER

FIELD OF THE INVENTION

The present subject matter relates generally to refrigerator appliances, and more particularly, to refrigerator appliances having a dispenser.

BACKGROUND OF THE INVENTION

Refrigerator appliances generally include a cabinet that defines a chilled chamber. A wide variety of food items may be stored within the chilled chamber. The low temperature of the chilled chamber relative to ambient atmosphere assists with increasing a shelf life of the food items stored within the chilled chamber.

Refrigerator appliances may also be equipped with a dispensing system. Such dispensing systems typically provide chilled water and/or ice from inside of the refrigerator appliance to a dispensing outlet accessible from outside of the refrigerator appliance. Such dispensing outlets are typically provided in an external surface of a door of the refrigerator appliance, in order to provide access to the water and/or ice from inside of the refrigerator appliance without requiring opening the door.

However, such systems typically provide little, if any, interactive or engaging features.

Accordingly, a refrigerator with an improved dispensing system is desired. For example, a dispensing system with features for improved visual interest and/or acoustic interest would be useful.

BRIEF DESCRIPTION OF THE INVENTION

Aspects and advantages of the invention will be set forth in part in the following description, or may be apparent from the description, or may be learned through practice of the invention.

In one exemplary aspect, a refrigerator appliance is provided. The refrigerator appliance defines a vertical direction, a lateral direction, and a transverse direction. The vertical, lateral, and transverse directions are mutually perpendicular. The refrigerator appliance includes a cabinet with a food storage chamber defined in the cabinet. The food storage chamber extends between a front portion and a back portion along the transverse direction. The front portion of the food storage chamber defines an opening for receipt of food items. The refrigerator appliance also includes a door rotatably mounted to the cabinet at the front portion of the food storage chamber. The door is movable between a closed position and an open position to selectively sealingly enclose the food storage chamber. The door includes an outer surface and an opposing inner surface. The inner surface faces towards the food storage chamber when the door is in the closed position and the outer surface faces away from the food storage chamber when the door is in the closed position. The refrigerator appliance further includes a dispensing assembly formed in the outer surface of the door. The dispensing assembly includes a dispenser recess with a flexible hose that is in fluid communication with a water supply to deliver water to the dispenser recess. The dispensing assembly also includes an actuating mechanism in operative communication with the water supply to cause the water supply to deliver a flow of water to the flexible hose when the actuating mechanism is activated. The dispensing assembly further includes a vibration generator coupled to the flexible hose and in operative communication with the actuating mechanism such that the vibration generator is activated when the actuating mechanism is activated. The vibration generator moves the flexible hose relative to the dispenser recess along the lateral direction when the vibration generator is activated, thereby providing a wave pattern flow of water from the flexible hose.

In another exemplary aspect, a refrigerator appliance is provided. The refrigerator appliance includes a cabinet with a food storage chamber defined in the cabinet. The food storage chamber includes a front portion and the front portion of the food storage chamber defines an opening for receipt of food items. The refrigerator appliance also includes a door rotatably mounted to the cabinet at the front portion of the food storage chamber. The door is movable between a closed position and an open position to selectively sealingly enclose the food storage chamber. The door includes an outer surface and an opposing inner surface. The inner surface faces towards the food storage chamber when the door is in the closed position and the outer surface faces away from the food storage chamber when the door is in the closed position. The refrigerator appliance further includes a dispensing assembly formed in the outer surface of the door. The dispensing assembly includes a dispenser recess with a flexible hose that is in fluid communication with a water supply to deliver water to the dispenser recess. The dispensing assembly also includes an actuating mechanism in operative communication with the water supply to cause the water supply to deliver a flow of water to the flexible hose when the actuating mechanism is activated. The dispensing assembly further includes a vibration generator coupled to the flexible hose and in operative communication with the actuating mechanism such that the vibration generator is activated when the actuating mechanism is activated. The vibration generator moves the flexible hose relative to the dispenser recess when the vibration generator is activated, thereby providing a wave pattern flow of water from the flexible hose.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
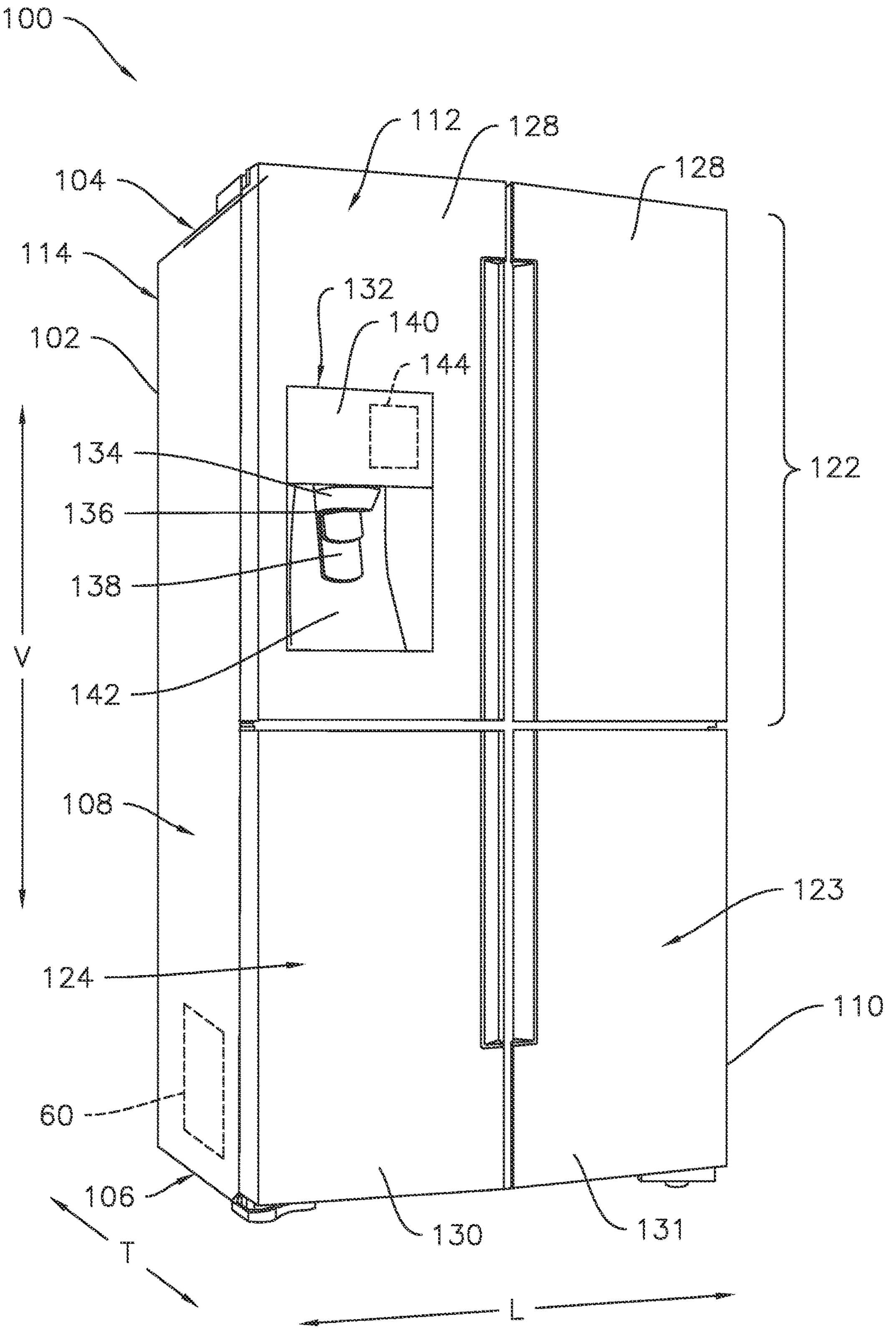
FIG. 1 provides a perspective view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. Terms such as "inner" and "outer" refer to relative directions with respect to the interior and exterior of the refrigerator appliance, and in particular the food storage chamber(s) defined therein. For example, "inner" or "inward" refers to the direction towards the interior of the refrigerator appliance. Terms such as "left," "right," "front," "back," "top," or "bottom" are used with reference to the perspective of a user accessing the refrigerator appliance. For example, a user stands in front of the refrigerator to open the doors and reaches into the food storage chamber(s) to access items therein.

As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

FIG. 1 provides a perspective view of a refrigerator appliance 100 according to an exemplary embodiment of the present subject matter. Refrigerator appliance 100 includes a housing or cabinet 102 that extends between a top 104 and a bottom 106 along a vertical direction V, between a left side 108 and a right side 110 along a lateral direction L, and between a front side 112 and a rear side 114 along a transverse direction T. Each of the vertical direction V, lateral direction L, and transverse direction T are mutually perpendicular to one another and form an orthogonal direction system.

Cabinet 102 defines chilled chambers for receipt of food items for storage. In particular, cabinet 102 defines fresh food chamber 122 positioned at or adjacent top 104 of cabinet 102 with a freezer chamber 124 and a convertible chamber 123 arranged at or adjacent bottom 106 of cabinet 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance or a side-by-side style refrigerator appliance. As another example, although the illustrated example embodiment depicts the freezer chamber 124 on the left side and the convertible chamber 123 on the right side, it is recognized that such configuration is provided by way of example only and not limitation, e.g., the freezer chamber 124 and the convertible chamber 123 may be transposed in some embodiments. Consequently, the description set forth herein is for illustrative purposes only and is not intended to be limiting in any aspect to any particular refrigerator chamber configuration.

Refrigerator doors 128 are each rotatably hinged to a corresponding edge of cabinet 102 for selectively accessing fresh food chamber 122. Similarly, freezer door 130 and convertible chamber door 131 are rotatably hinged to an edge of cabinet 102 in the illustrated example embodiment for selectively accessing freezer chamber 124 and convertible chamber 123. As another example, one or both of the freezer door 130 and the convertible chamber door 131 may instead be a front portion of a slidable drawer which can be selectively moved in and out of the respective chamber 123 and/or 124 along transverse direction T. To prevent leakage of cool air, the doors 128, 130, 131, and/or cabinet 102 may define one or more sealing mechanisms (e.g., rubber gaskets, not shown) at the interface where the doors 128, 130, 131 meet cabinet 102. Refrigerator doors 128, freezer door 130, and convertible chamber door 131 are shown in the closed configuration in FIG. 1 and in the open configuration in FIG. 2. It should be appreciated that doors having a different style, position, or configuration are possible and within the scope of the present subject matter.

In an exemplary embodiment, cabinet 102 also defines a mechanical compartment 60 at or near the bottom 106 of the cabinet 102 for receipt of a hermetically sealed cooling system configured for transporting heat from the inside of the refrigerator to the outside. One or more ducts may extend between the mechanical compartment 60 and the chilled chambers 122, 123, and/or 124 to provide fluid communication therebetween, e.g., to provide chilled air from the hermetically sealed cooling system, e.g., from an evaporator thereof, to one or more of the chilled chambers 122, 123, and/or 124. As is generally understood by those of skill in the art, the hermetically sealed system contains a working fluid, e.g., refrigerant, which flows between various heat exchangers of the sealed system where the working fluid changes phases. For example, the hermetically sealed system includes at least one evaporator where the working fluid absorbs thermal energy and changes from a liquid state to a gas state and at least one condenser where the working fluid releases thermal energy and returns to the liquid state from the gas state. As is understood, because the system is sealed, the working fluid is contained within the system and travels between the heat exchangers of the hermetically sealed system. A fan is typically provided at each heat exchanger of the sealed system. For example, a fan may force air across and around the at least one evaporator to transfer thermal energy from the air to the evaporator (and more particularly, to the working fluid therein), thereby generating a flow of chilled air which may be provided to one or more of the chilled chambers 122, 123, and/or 124. In some embodiments, some components of the sealed system may be located on different sides of a thermally insulated barrier, e.g., the at least one condenser may be positioned outside of the thermally insulated barrier with respect to the chilled chambers such that heat released from the working fluid as it condenses is directed away from the chilled chambers and to an ambient environment around the refrigerator appliance 100, and the at least one evaporator may be positioned on the same side of the thermally insulated barrier as the chilled chambers, whereby the flow of chilled air from the evaporator(s) to the chilled chambers may be entirely contained within a thermally insulated enclosure.

Refrigerator appliance 100 also includes a dispensing assembly 132 for dispensing liquid water and/or ice. Dispensing assembly 132 includes a dispenser 134 positioned on or mounted to an exterior portion of refrigerator appliance 100, e.g., on an outer surface of one of refrigerator doors 128. Dispenser 134 includes a discharging outlet 136 for accessing ice and liquid water. An actuating mechanism 138, shown as a paddle, is mounted below discharging outlet 136 for operating dispenser 134. In alternative exemplary embodiments, any suitable actuating mechanism may be used to operate dispenser 134. For example, dispenser 134 can include a sensor (such as an ultrasonic sensor) or a button rather than the paddle. A control panel 140 is provided for controlling the mode of operation. For example, control panel 140 includes a plurality of user inputs (not labeled), such as a water dispensing button and an ice-dispensing button, for selecting a desired mode of operation such as crushed or non-crushed ice.

Discharging outlet 136 and actuating mechanism 138 are an external part of dispenser 134 and are mounted in a dispenser recess 142. Dispenser recess 142 is positioned at a predetermined elevation convenient for a user to access ice or water and enabling the user to access ice without the need to bend-over and without the need to open refrigerator doors 128. In the exemplary embodiment, dispenser recess 142 is positioned at a level that approximates the chest level of an adult user. According to an exemplary embodiment, the dispensing assembly 132 may receive ice from an icemaker disposed in a sub-compartment of the fresh food chamber 122.

Refrigerator appliance 100 further includes a controller 144. Operation of the refrigerator appliance 100 is regulated by controller 144 that is operatively coupled to control panel 140. In some exemplary embodiments, control panel 140 may represent a general purpose I/O ("GPIO") device or functional block. In some exemplary embodiments, control panel 140 may include input components, such as one or more of a variety of electrical, mechanical or electro-mechanical input devices including rotary dials, push buttons, touch pads, and touch screens. Control panel 140 can be communicatively coupled with controller 144 via one or more signal lines or shared communication busses. Control panel 140 provides selections for user manipulation of the operation of refrigerator appliance 100, e.g., whereby a user may provide one or more set point temperatures for the various compartments 122, 123, and 124. In response to user manipulation of the control panel 140, controller 144 operates various components of refrigerator appliance 100. For example, controller 144 is operatively coupled or in communication with various airflow components, e.g., dampers and fans, as discussed below. Controller 144 may also be communicatively coupled with a variety of sensors, such as, for example, chamber temperature sensors or ambient temperature sensors. Such chamber temperature sensors and/or ambient temperature sensors may be or include thermistors, thermocouples, or any other suitable temperature sensor. Controller 144 may receive signals from these temperature sensors that correspond to the temperature of an atmosphere or air within their respective locations.

Controller 144 includes memory and one or more processing devices such as microprocessors, CPUs or the like, such as general or special purpose microprocessors operable to execute programming instructions or micro-control code associated with operation of refrigerator appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 144 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. The controller 144 may be positioned in a variety of locations throughout refrigerator appliance 100. In the illustrated embodiment, the controller 144 is located within a control panel area 140 of one of the refrigerator doors 128, as shown in FIG. 1. In other example embodiments, the controller 144 may be positioned at or near the rear side 114 and/or the bottom 106 of the refrigerator appliance 100.

Figure 2:
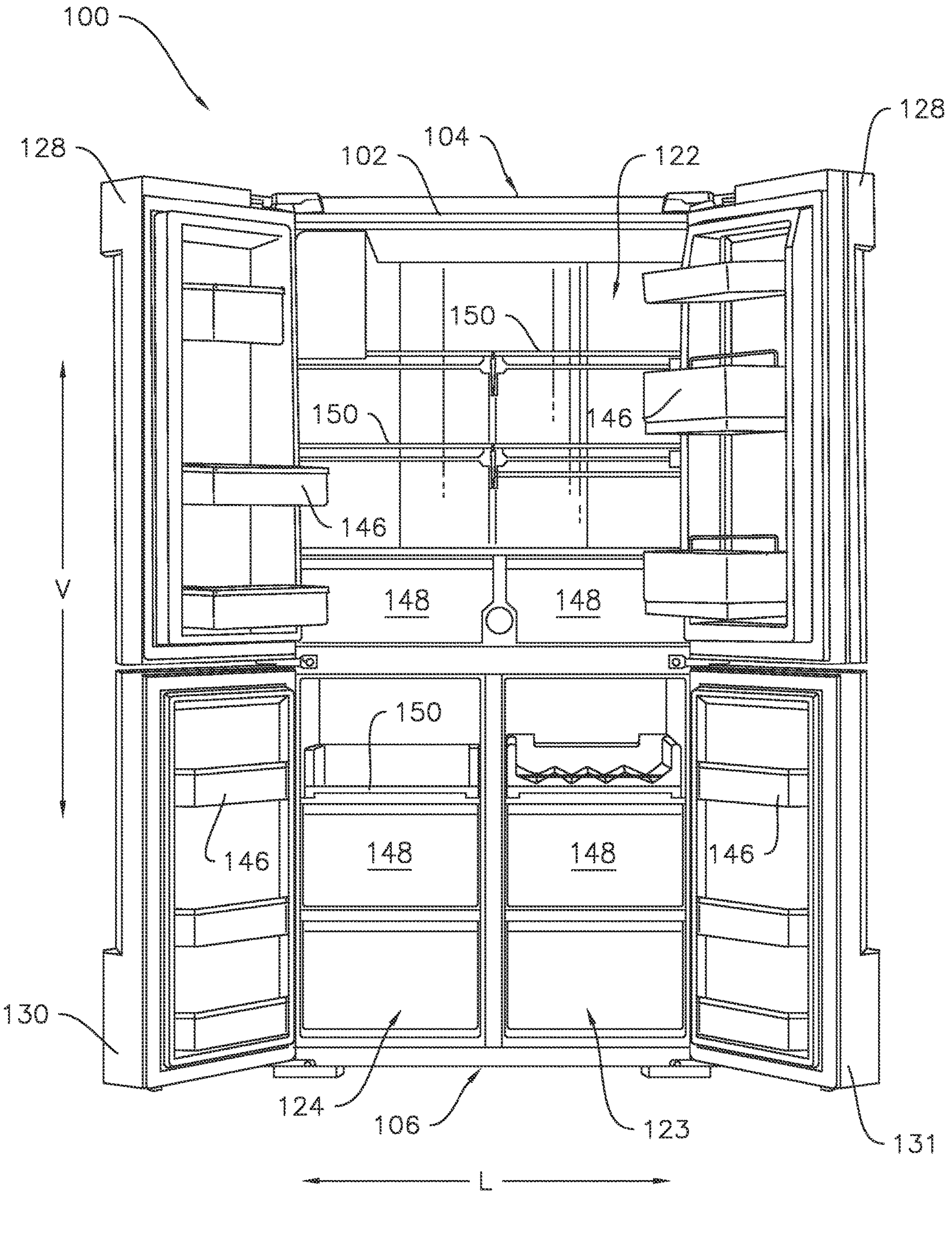
FIG. 2 provides a front view of the exemplary refrigerator appliance of FIG. 1 with the refrigerator and freezer doors of the refrigerator appliance shown in an open position.

FIG. 2 provides a front view of refrigerator appliance 100 with refrigerator doors 128, freezer door 130, and convertible chamber door 131 shown in an open position. According to the illustrated embodiment, various storage components are mounted within fresh food chamber 122, convertible chamber 123, and freezer chamber 124 to facilitate storage of food items therein as will be understood by those skilled in the art. In particular, the storage components include bins 146, drawers 148, and shelves 150 that are mounted within fresh food chamber 122, convertible chamber 123, or freezer chamber 124. Bins 146, drawers 148, and shelves 150 are configured for receipt of food items (e.g., beverages and/or solid food items) and may assist with organizing such food items. As an example, drawers 148 of fresh food chamber 122 can receive fresh food items (e.g., vegetables, fruits, and/or cheeses) and increase the useful life of such fresh food items.

It is to be recognized that the benefits of the present disclosure apply to other types and styles of refrigerator appliances such as, e.g., a top mount refrigerator appliance, a side-by-side style refrigerator appliance or a standalone refrigerator-only or freezer-only appliance, compact, and any other style or model of refrigerator appliance. Consequently, the description set forth herein is for illustrative purposes only and is not intended to be limiting in any aspect to any particular configuration, such as not limiting to any particular refrigerator chamber configuration. Accordingly, the description herein of features such as the convertible chamber 123, among other features, are by way of example only. Using the teachings disclosed herein, one of skill in the art will understand that the present subject matter can be used with any other style or model of refrigerator appliance.

Figure 3:
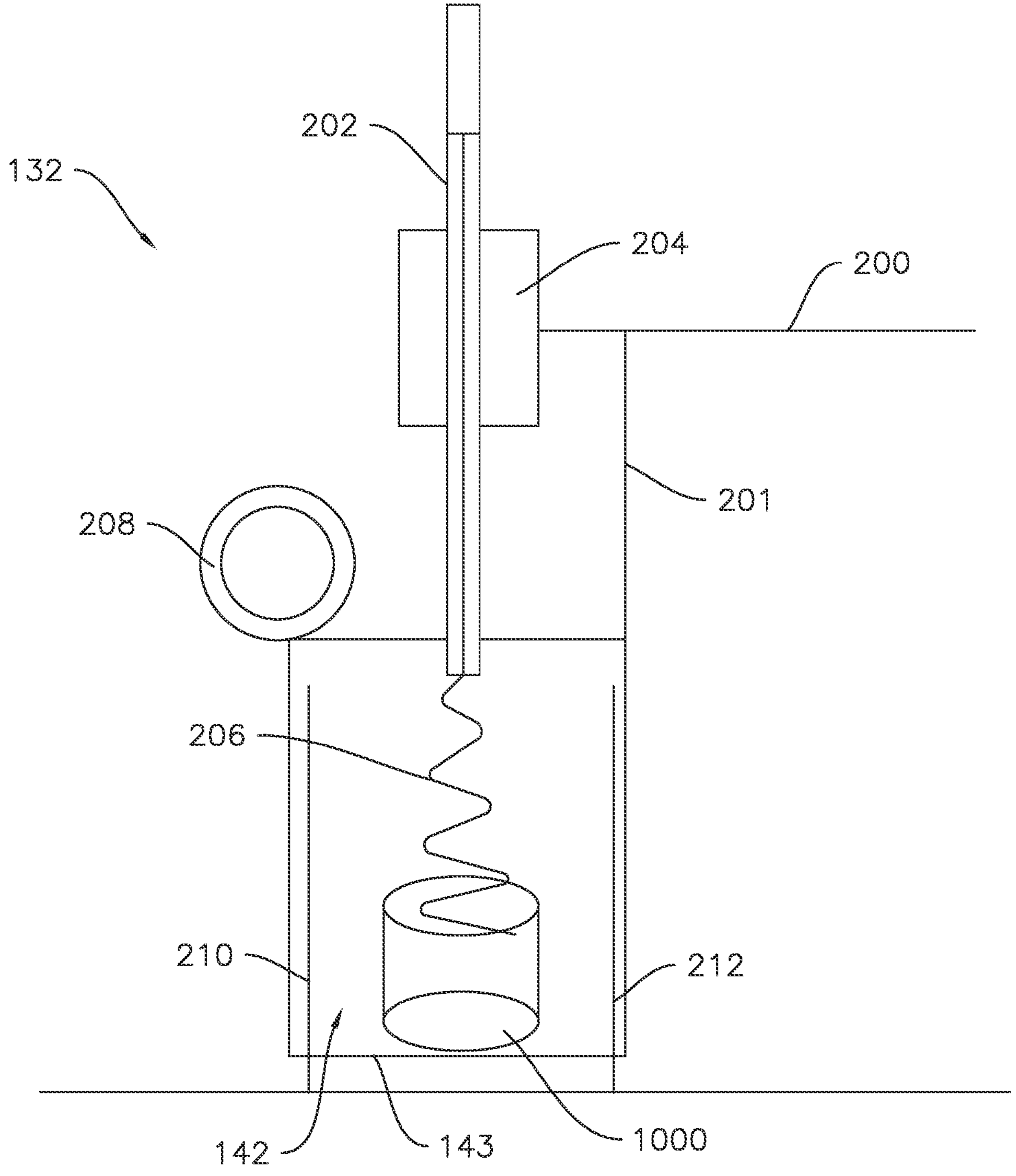
FIG. 3 provides a schematic view of a mesmerizing dispenser according to one or more exemplary embodiments of the present subject matter, which may be incorporated into a refrigerator such as the exemplary refrigerator appliance of FIG. 1.

Turning now to FIG. 3, a schematic illustration of a dispensing assembly 132 according to one or more exemplary embodiments of the present disclosure is provided. The dispensing assembly 132 may include a dispenser recess 142 with a platform 143 defined therein for receiving a vessel 1000, and the dispensing assembly may provide, e.g., water, to the dispenser recess 142 and/or the vessel 1000 therein. As illustrated in FIG. 3, the dispensing assembly 132 may include a vibration generator 204. In various embodiments, as described in more detail below, the vibration generator 204 may be a mechanical vibration generator, e.g., a motor, or an acoustic vibration generator, e.g., a speaker.

The vibration generator 204 may be connected to the controller 144 of the refrigerator appliance 100 and/or the actuating mechanism, e.g., paddle, 138, by a first communication line 200. Thus, the vibration generator 204 may be activated when the actuating mechanism 138 is activated, e.g. when the paddle is depressed or when the sensor (in embodiments where the actuating mechanism 138 is or includes a sensor) detects a vessel 1000 in the dispenser recess 142.

The vibration generator may, in various embodiments, be located adjacent to and/or in contact with a flexible hose 202. The flexible hose 202 may comprise any suitable flexible material, such as silicone. As illustrated in FIG. 3, the flexible hose 202 may be in fluid communication with a water supply to deliver water to the dispenser recess. For example, as those of ordinary skill in the art will recognize, the water supply may be a well, a municipal water system, or other suitable source of drinking water that is connected to a plumbing system in the building, e.g., residence or office, etc., in which the refrigerator appliance 100 is located. As is generally understood by those of ordinary skill in the art, the refrigerator appliance 100 may include a fitting (not shown) and a valve (not shown) for connecting to the plumbing system and may thereby receive water from the water supply. Thus, when the actuating mechanism 138 is activated, the valve may be opened, e.g., by the controller 144, to deliver a flow of water from the water supply to the refrigerator appliance 100, e.g., to the dispensing assembly 132 thereof via the flexible hose 202.

As mentioned above, the vibration generator 204 may be connected to the actuating mechanism 138 and/or controller 144 via a first communication line 200, e.g., such that the vibration generator 204 is activated when the actuating mechanism 138 is activated. Thus, in response to the actuating mechanism 138 being activated, water may flow to the flexible hose 202 and from the flexible hose 202 to the dispenser recess 142 and a vessel 1000 placed therein, while the vibration generator 204 is also activated, and the vibration generator 204 may move the flexible hose 202 relative to the dispenser recess 142, causing a wave pattern flow of water 206 to be provided to the dispenser recess 142 and the vessel 1000 therein. Thus, it is understood that the term "flexible" in the context of the flexible hose 202 means a material which transmits vibrations from the vibration generator 204 to water flowing through the hose 202 sufficiently to produce the wave pattern with the characteristics, e.g., wavelength, described below without damage to the hose 202 and without damaging or loosening connections between the hose 202 and the water supply.

In some embodiments, e.g., as illustrated in FIG. 3, the dispensing assembly 132 may include one or more arrays of light-emitting diodes (LEDs). For example, a first array of LEDs 210 may be positioned within the dispenser recess 142 on one side of the dispenser recess 142 and a second array of LEDs 212 may be positioned opposite the first array of LEDs 210 within the dispenser recess 142. One or both of the arrays of LEDs may be interconnected with the actuating mechanism 138 and/or controller 144, e.g., by a second communication line 201, such that the array(s) of LEDs 210, 212 are activated at the same time the vibration generator 204 is activated. Additionally, in some embodiments, the array(s) of LEDs 210, 212 may be synchronized with the vibration generator 204, such that the LEDs turn on and off at the same time and same rate as the vibration generator 204 generates pulses.

In some embodiments, e.g., as illustrated in FIG. 3, the dispensing assembly 132 may include a loudspeaker 208. In embodiments where the vibration generator 204 is a speaker 218, the loudspeaker 208 is in addition to the speaker 218. The loudspeaker 208 may be configured to play music when the actuating mechanism 138 is activated. The loudspeaker 208 may also be connected in series with the array(s) of LEDs 210, 212, whereby the array of light emitting diodes 210, 212 and the loudspeaker 208 are activated at the same time, e.g., each is activated whenever the other is activated.

In some embodiments, the wave pattern flow of water 206 from the flexible hose 202 may be a sinusoidal wave pattern. In some embodiments, the wave pattern flow of water 206 from the flexible hose 202 may have an amplitude and a wavelength. The wavelength may be determined, for example, based on the velocity of water flowing from the flexible hose 202 divided by the frequency of vibration provided by the vibration generator 204. Thus, the vibration generator 204 may be configured to vibrate the flexible hose 202 at a predetermined frequency to provide the wave pattern flow of water 206 with a predetermined wavelength. For example, the predetermined frequency may be between about 20 Hz and about 40 Hz, such as between about 25 Hz and about 35 Hz, such as about 25 Hz, about 30 Hz, or about 35 Hz. A predetermined frequency of vibration of about 25 Hz may result in a wavelength of the wave pattern flow of water 206 of about 64 mm, a predetermined frequency of vibration of about 30 Hz may result in a wavelength of the wave pattern flow of water 206 of about 54 mm, and predetermined frequency of vibration of about 35 Hz may result in a wavelength of the wave pattern flow of water 206 of about 46 mm. In such embodiments, the wave pattern flow of water 206 may include between about four cycles, e.g., four peaks and four troughs, and about six cycles, e.g., six peaks and six troughs, as the wave pattern 206 traverses the vertical distance of the dispenser recess 142.

Figure 4:
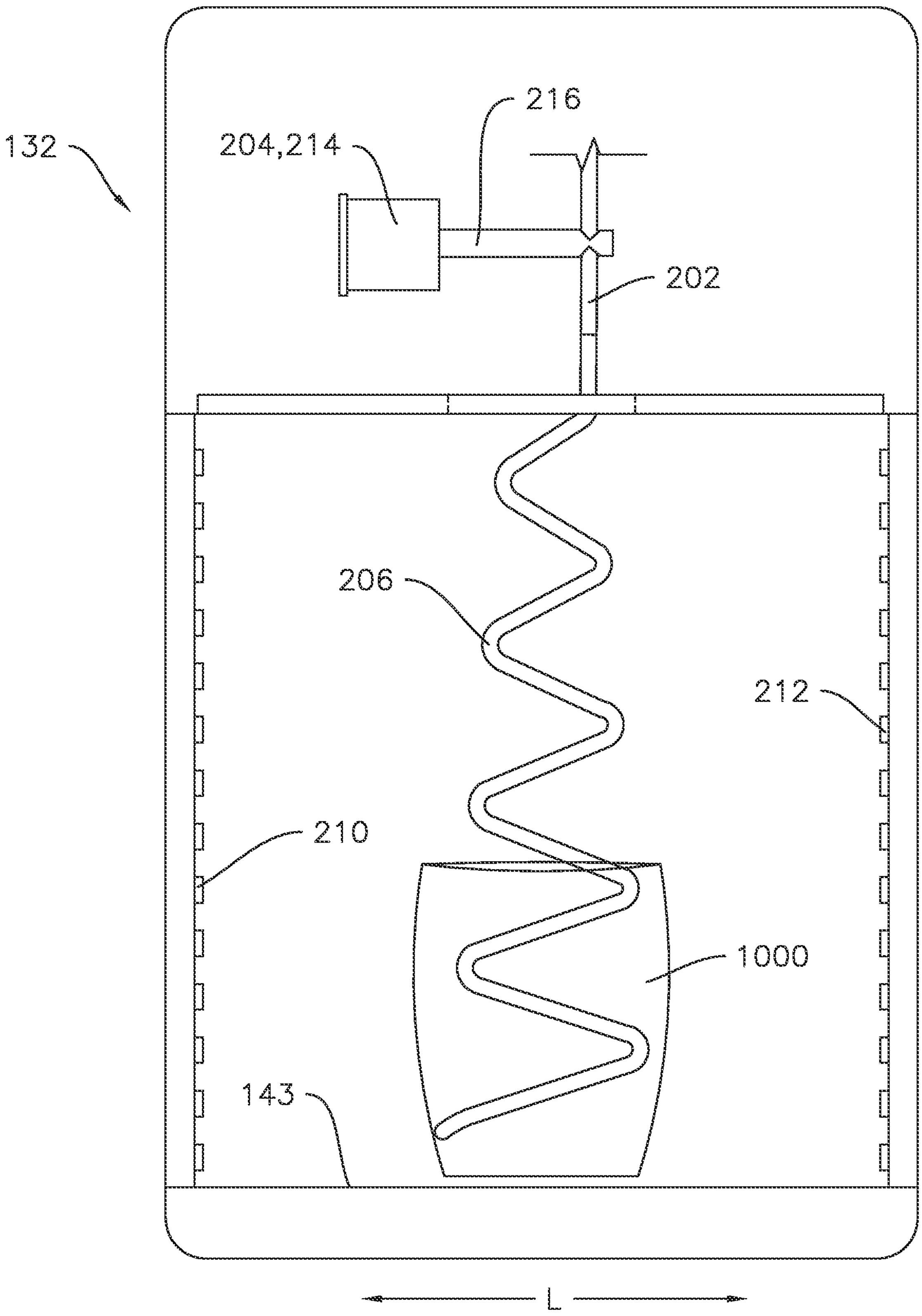
FIG. 4 provides an additional schematic view of a mesmerizing dispenser according to one or more further exemplary embodiments of the present subject matter.
Figure 5:
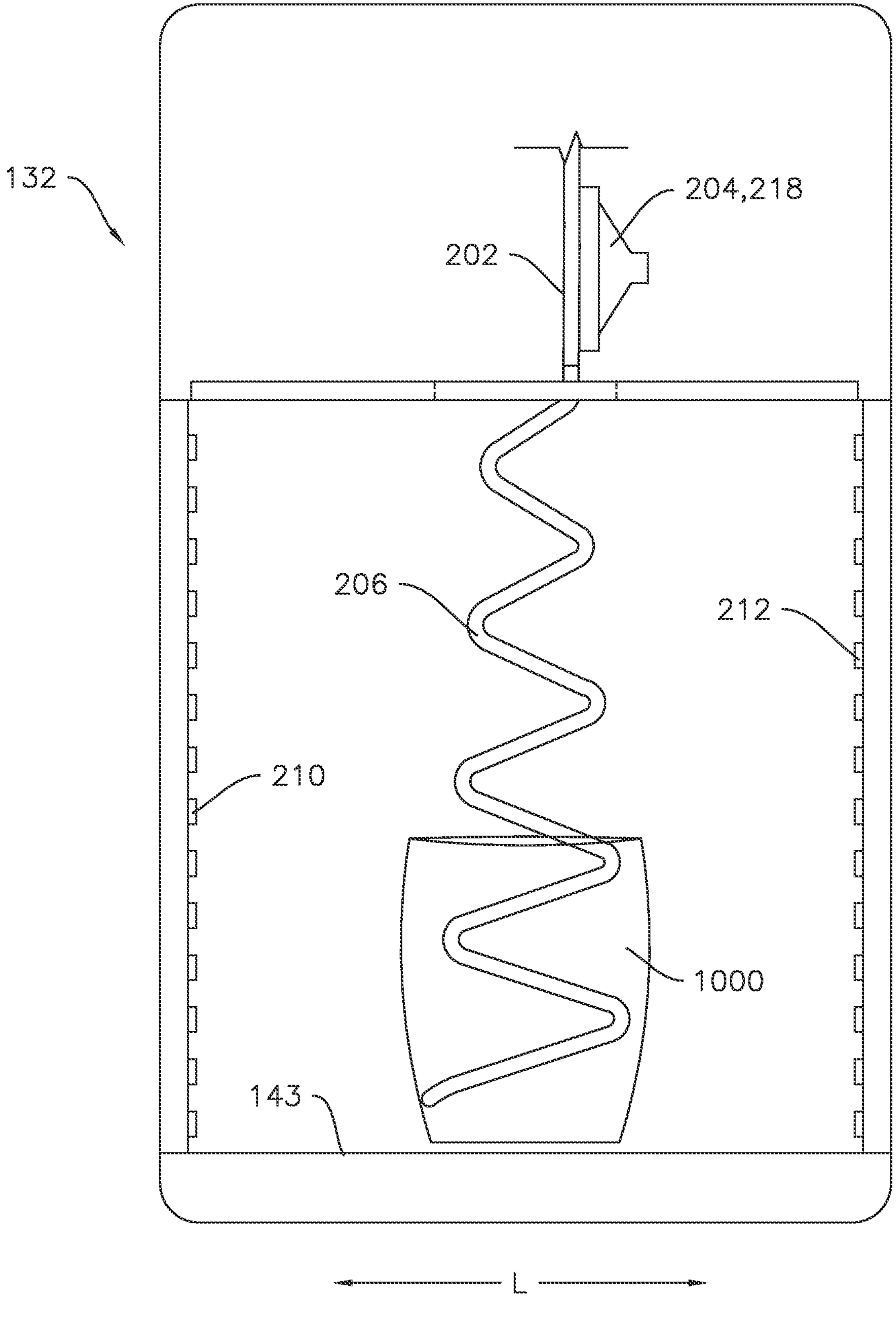
FIG. 5 schematic view of a mesmerizing dispenser according to one or more further exemplary embodiments of the present subject matter.
Figure 6:
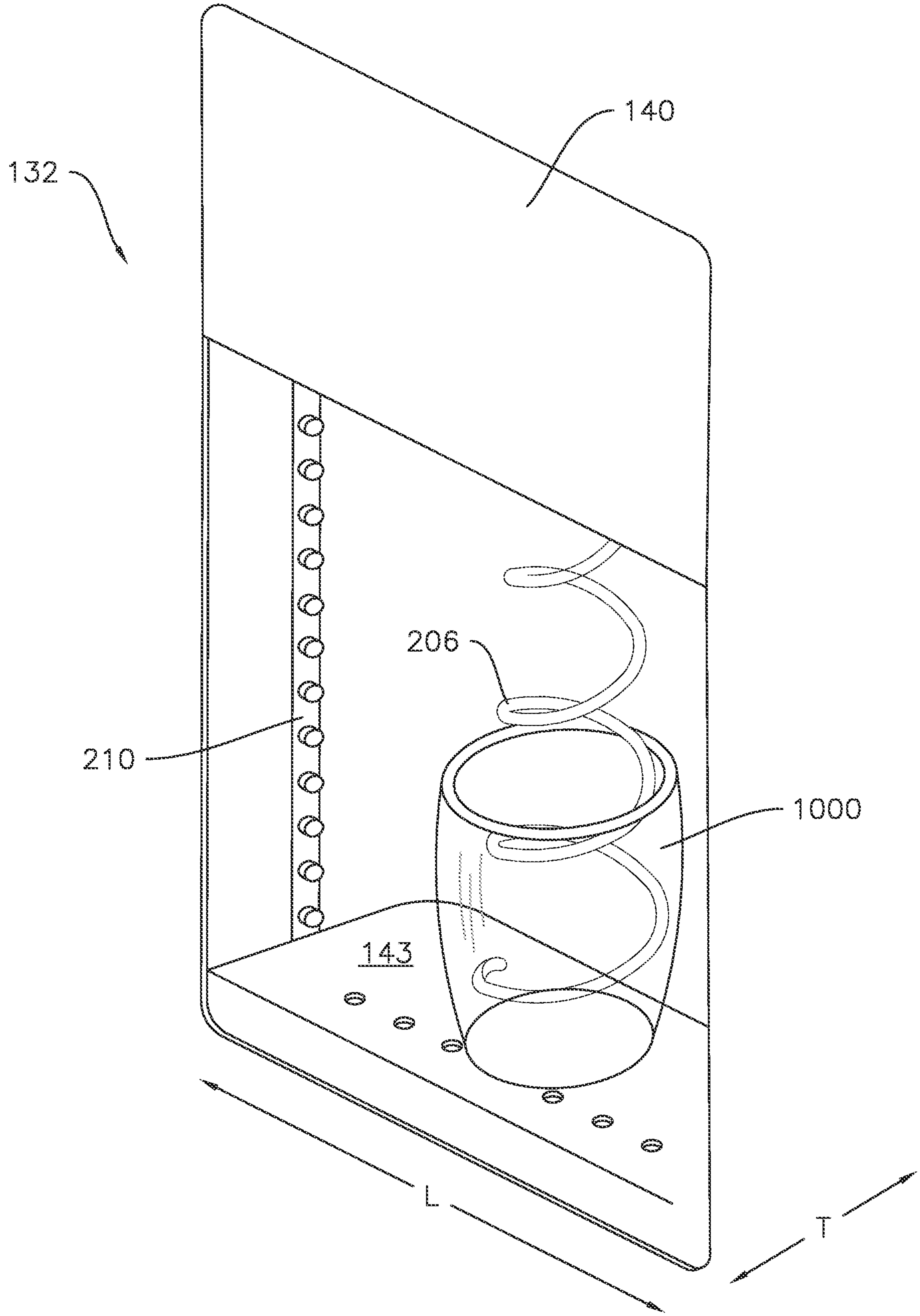
FIG. 6 provides a perspective view of a mesmerizing dispenser according to one or more additional exemplary embodiments of the present subject matter.

Turning now to FIGS. 4 through 6, in various embodiments, the flexible hose 202 may move relative to the dispenser recess 142 along at least the lateral direction L, e.g., as may be seen in FIGS. 4 and 5, and may also move relative to the dispenser recess 142 along the transverse direction T, e.g., as seen in FIG. 6. Thus, the wave pattern flow of water 206 may be a flat wave or may be a spiral pattern. The spiral shape of the wave pattern flow of water 206 is best seen in FIG. 6.

In some embodiments, e.g., as illustrated in FIG. 4, the vibration generator 204 may be a motor 214. As may be seen in FIG. 4, in such embodiments, the vibration generator 204, e.g., motor 214, may be directly connected to the flexible hose 202, such as by linkage 216. The flexible hose 202 may pass through the linkage 216, such that the flexible hose 202 is in contact with the linkage 216 around an entire outer perimeter, e.g., circumference, of the flexible hose 202. For example, in such embodiments, the linkage 216 may thereby transfer vibration directly from the motor 214 in at least two directions, e.g., both to the left and to the right on the page in FIG. 4, such as back and forth along the lateral direction L.

In some embodiments, e.g., as illustrated in FIG. 5, the vibration generator 204 may be a speaker 218. In such embodiments, the flexible hose 202 may not be constrained, e.g., in contrast to embodiments where the linkage 216 is provided as described above. The flexible hose 202 may contact the speaker 218, e.g., as illustrated in FIG. 5, and may thereby receive vibrations directly from the speaker 218. For example, in some embodiments wherein the vibration generator 204 is a speaker 218, the flexible hose 202 may contact the speaker 218 on only one side of the flexible hose 202.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance defining a vertical direction, a lateral direction, and a transverse direction, the vertical, lateral, and transverse directions being mutually perpendicular, the refrigerator appliance comprising:

a cabinet;

a food storage chamber defined in the cabinet, the food storage chamber extending between a front portion and a back portion along the transverse direction, the front portion of the food storage chamber defining an opening for receipt of food items;

a door rotatably mounted to the cabinet at the front portion of the food storage chamber, the door movable between a closed position and an open position to selectively sealingly enclose the food storage chamber, the door comprising an outer surface and an opposing inner surface, wherein the inner surface faces towards the food storage chamber when the door is in the closed position and the outer surface faces away from the food storage chamber when the door is in the closed position; and a dispensing assembly formed in the outer surface of the door, the dispensing assembly comprising:

a dispenser recess;

a flexible hose configured for fluid communication with a water supply to deliver water to the dispenser recess;

an actuating mechanism operable to cause the water supply to deliver a flow of water to the flexible hose when the actuating mechanism is activated; and a vibration generator coupled to the flexible hose and in operative communication with the actuating mechanism, whereby the vibration generator is activated when the actuating mechanism is activated, and wherein the vibration generator moves the flexible hose relative to the dispenser recess along the lateral direction and along the transverse direction when the vibration generator is activated, thereby providing a spiral pattern flow of water from the flexible hose.

2. The refrigerator appliance of claim 1, wherein the vibration generator comprises a motor directly coupled to the flexible hose.

3. The refrigerator appliance of claim 2, wherein the motor is configured to vibrate the flexible hose at a predetermined frequency to provide the spiral pattern flow of water with a predetermined wavelength.

4. The refrigerator appliance of claim 1, wherein the vibration generator comprises a speaker adjacent to the flexible hose.

5. The refrigerator appliance of claim 4, further comprising a controller, the controller configured to provide a specified frequency to the speaker to produce a predetermined wave pattern in the flow of water from the flexible hose.

6. The refrigerator appliance of claim 1, further comprising an array of light emitting diodes in the dispenser recess.

7. The refrigerator appliance of claim 6, wherein the array of light emitting diodes is synchronized with the vibration generator.

8. The refrigerator appliance of claim 1, further comprising a loudspeaker configured to play music when the actuating mechanism is activated.

9. The refrigerator appliance of claim 8, further comprising an array of light emitting diodes in the dispenser recess, the array of light emitting diodes connected in series with the loudspeaker, whereby the array of light emitting diodes is activated when the loudspeaker is activated.

10. A refrigerator appliance, comprising:

a cabinet;

a food storage chamber defined in the cabinet, the food storage chamber comprising a front portion, the front portion of the food storage chamber defining an opening for receipt of food items;

a door rotatably mounted to the cabinet at the front portion of the food storage chamber, the door movable between a closed position and an open position to selectively sealingly enclose the food storage chamber, the door comprising an outer surface and an opposing inner surface, wherein the inner surface faces towards the food storage chamber when the door is in the closed position and the outer surface faces away from the food storage chamber when the door is in the closed position; and a dispensing assembly formed in the outer surface of the door, the dispensing assembly comprising:

a dispenser recess;

a flexible hose configured for fluid communication with a water supply to deliver water to the dispenser recess;

an actuating mechanism operable to cause the water supply to deliver a flow of water to the flexible hose when the actuating mechanism is activated;

a vibration generator coupled to the flexible hose and in operative communication with the actuating mechanism, whereby the vibration generator is activated when the actuating mechanism is activated, and wherein the vibration generator moves the flexible hose relative to the dispenser recess when the vibration generator is activated, thereby providing a wave pattern flow of water from the flexible hose; and an array of light emitting diodes in the dispenser recess, the array of light emitting diodes synchronized with the vibration generator.

11. The refrigerator appliance of claim 10, wherein the vibration generator comprises a motor directly coupled to the flexible hose.

12. The refrigerator appliance of claim 11, wherein the motor is configured to vibrate the flexible hose at a predetermined frequency to provide the wave pattern flow of water with a predetermined wavelength.

13. The refrigerator appliance of claim 10, wherein the vibration generator comprises a speaker adjacent to the flexible hose.

14. The refrigerator appliance of claim 13, further comprising a controller, the controller configured to provide a specified frequency to the speaker to produce a predetermined wave pattern in the flow of water from the flexible hose.

15. The refrigerator appliance of claim 10, further comprising a loudspeaker configured to play music when the actuating mechanism is activated.

16. The refrigerator appliance of claim 15, further comprising the array of light emitting diodes in the dispenser recess, the array of light emitting diodes connected in series with the loudspeaker, whereby the array of light emitting diodes is activated when the loudspeaker is activated.

17. The refrigerator appliance of claim 10, wherein the wave pattern flow of water from the flexible hose is a sinusoidal wave pattern comprising an amplitude and a wavelength.

* * * * *